United States Patent Office 3,397,181
Patented Aug. 13, 1968

3,397,181
COPOLYMERIZATION OF TRIOXANE WITH AN EPOXY-CONTAINING COMONOMER IN THE PRESENCE OF FORMALDEHYDE
George W. Halek, New Providence, and Frank M. Berardinelli, South Orange, N.J., assignors to Celanese Corporation, New York, N.Y., a corporation of Delaware
No Drawing. Continuation-in-part of application Ser. No. 353,588, Mar. 20, 1964. This application Mar. 8, 1967, Ser. No. 621,448
8 Claims. (Cl. 260—67)

ABSTRACT OF THE DISCLOSURE

Trioxane is copolymerized with an epoxy-containing comonomer in the presence of formaldehyde in order to reduce the induction period.

CROSS-REFERENCE TO RELATED CASES

The present application is a continuation-in-part of application Ser. No. 353,588, filed Mar. 20, 1964, and assigned to the assignee of the present invention.

BACKGROUND OF THE INVENTION

The present invention relates to the copolymerization of trioxane with a minor amount of at least one epoxy-containing comonomer to produce a strong, stable plastic material. More particularly, the invention relates to the achievement of more rapid copolymerization in such processes by elimination or substantial reduction of a prepolymerization induction period.

It has previously been disclosed that in some instances when trioxane is homopolymerized, a period of time elapses from when the catalyst or initiator is added to the system to when polymerization of the trioxane to high polymer begins. See, for example, Kern et al., Angewandte Chemie, vol. 73(6), Mar. 21, 1961, pp. 177–186. This time lapse has been referred to as an induction period, during which it is believed that the depolymerization of trioxane to formaldehyde occurs to the essential exclusion of trioxane polymerization. The trioxane polymerization itself begins only when the formaldehyde has attained a given equilibium concentration or amount, which varies with the polymerization reaction temperatures employed.

Ideally, the induction period is as close to zero time as possible such that trioxane polymer formation begins the instant the catalyst is added to the polymerization zone or system.

In order to eliminate or minimize the induction period in the trioxane homopolymerization it has been suggested that extraneous formaldehyde be added to the system, preferably in an amount equal to the equilibrium concentration. Thus, when the polymerization catalyst is introduced into the polymerization zone, trioxane polymerization begins immediately.

It has now been found that in addition to the induction period which may or may not occur when trioxane is homopolymerized, a further induction period, sometimes hereinafter referred to as a secondary induction period, occurs when trioxane is copolymerized with an epoxy-containing comonomer. In other words, the secondary induction period is in addition to what may be referred to as the primary induction period. Thus, even if the above-mentioned equilibrium concentration of formaldehyde is added to eliminate the primary induction period, the secondary induction period will still occur.

During the secondary induction period, as in the primary period, essentially no polymerization of trioxane to high polymer occurs. It has also been found that the length of the secondary induction period increases with increasing concentration of epoxy-containing comonomer in the reaction mixture. The induction periods result in inefficient use of the reaction space and necessitate larger reactors for a given amount of product in a given time.

SUMMARY OF THE INVENTION

Accordingly, the primary object of the present invention is to eliminate or substantially reduce the secondary induction period.

Another object of this invention is the provision of an efficient and simple method for carrying out the copolymerization of molten trioxane with an epoxy-containing comonomer, which may be readily effected in a continuous process.

Other objects of this invention will be apparent from the following detailed description and claims. In this description and claims all proportions are by weight unless otherwise indicated.

In accordance with the present invention trioxane is copolymerized with an epoxy-containing comonomer in the presence of a copolymerization catalyst in a copolymerization zone, wherein is introduced extraneous formaldehyde in an amount greater than that which is necessary to eliminate any primary induction period.

DESCRIPTION OF THE PREFERRED EMBODIMENT

It is important to understand that the so-called "primary induction period" which may occur during trioxane homopolymerization also may occur during trioxane copolymerization. The present invention, however, is directed to the elimination or substantial reduction of the secondary induction period, which always occurs when trioxane is copolymerized with an epoxy compound. Therefore, the formaldehyde is added to the system in an amount in excess of that needed to satisfy or eliminate the primary induction period, whenever it occurs.

The secondary induction period occurs only when an epoxy compound is copolymerized with the trioxane and is believed to be due to the epoxy compound acting as a formaldehyde scavanger. The epoxy compound causes the trioxane to depolymerize to formaldehyde which then reacts with the epoxy ring. This depolymerization continues to occur until there is a mol of formaldehyde for each epoxy ring or equivalent

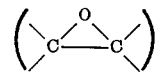

present in the system.

The number of mols of formaldehyde introduced into the polymerization zone per epoxy ring or equivalent present therein is desirably at least about 0.1. Amounts over about 0.5 mole are more effective, and best results are obtained when there is employed at least about 1 mol, e.g., 1.1 to 6 mols of formaldehyde per epoxy ring or equivalent. It is to be understood that the above mol figures are in addition to the mols of formaldehyde that are necessary to eliminate the primary induction period, when it occurs.

The equilibrium concentration or amount of formaldehyde necessary to eliminate the primary induction period may be determined by simple experimentation as well known to those skilled in the art, for example, by conducting a trioxane homopolymerization run under the same conditions that are to be used in the copolymerization and measuring the amount needed.

The copolymerization conditions of temperature, pressure, type of catalyst, comonomer concentration and the like are similar to those normally used in the copolymerization of trioxane with epoxy-containing comonomers, for example, as described in Walling et al. U.S. Patent No. 3,027,352, which is assigned to the assignee of the present invention. Other patents describing similar copolymerizations of trioxane and epoxides or epoxy compounds are British Patent No. 905,828; French Patent No. 1,319,178, of Fisher, Brown and Heinz; and South African Patent No. 62/4,471 of Heinz and McAndrew, the disclosures of which are incorporated herein by reference.

Suitable catalysts for the copolymerization of trioxane and oxirane (epoxy) compounds are well known in the art, and any of these may be employed in the practice of the present invention. Preferred catalysts of this type are cationic. As is known in the art the catalyst may be generated in situ by the action of radiation on ingredients of the reaction mixture which are non-catalysts in the absence of such radiation; one class of such activatable non-catalysts includes the light- or heat-activatable aryldiazonium fluoborates described in Belgian Patent No. 593,648 of Farbwerke Hoechst. The amount of catalyst usually used in the copolymerization process is between about 1 p.p.m. and about $10^4$ p.p.m. based on the weight of the reactant mass. Boron fluoride-containing catalysts are usually used in amounts between about 1 p.p.m. and about $10^4$ p.p.m. and preferably in amounts between about 10 p.p.m. and about $10^3$ p.p.m.

It is preferred to carry out the copolymerization of this invention in the liquid state, most preferably using molten trioxane wherein the molten trioxane constitutes the major portion, generally about 80 percent or more of the reaction mixture. However, it is within the scope of this invention to employ solid-state copolymerization.

Generally, the temperature of the copolymerization reaction will be in the range of about 0° to about 115° C., preferably in the range of about 60° to about 90° C.

It is to be understood that the term copolymer as used herein includes terpolymers and higher copolymers. In addition, more than one type of epoxy-containing comonomer may be copolymerized with the trioxane. Comonomers containing no epoxy rings or equivalents may also be employed as long as at least one of the comonomers used contains an epoxy ring or rings.

Illustrative of the epoxy-containing comonomers or compounds which may be used in the present invention are ethylene oxide; 1,2-propylene oxide, vinyl cyclohexene dioxide (1-epoxyethyl, 3,4-epoxycyclohexane), which is a di-epoxypropane, since it has two

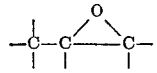

groups; cyclohexane oxide; styrene oxide; 3,4-epoxyvinyl cyclohexane; butadiene dioxide; butadiene monoxide; resorcinol diglycidyl ether; butanediol diglycidyl ether; diglycidyl ether; allyl glycidyl ether; phenyl glycidyl ether; trimethylolpropane triglycidyl ether; dicyclopentadiene dioxide; dipentene dioxide; isobutylene oxide; indene oxide; butylene oxide; octylene oxide and other alkylene oxides; or 1,4-dihydronaphthalene oxide. The epoxy-containing comonomer may also contain non-hydrocarbon substituents; for example there may used compounds containing halo, nitro, or nitrogenous heterocyclic, or carboxylic ester substituents, such as epichlorohydrin and other epihalohydrins; pentachlorophenyl glycidyl ether; paranitrophenyl glycidyl ether; ethyl-β-methyl-β-phenyl glycidate; trichloromethyl ethylene oxide; α-phenyl-α-chloromethyl ethylene oxide; 3-piperonyl-1,2-epoxypropane; or 4-bromo-1-naphthyl ethylene oxide.

Generally, ethylene oxide is more reactive toward trioxane than any of the other above mentioned epoxy compounds. Thus, it is preferred to use ethylene oxide as the sole epoxy compound or to use the other epoxy compounds in association with a second, more highly reactive, comonomer such as ethylene oxide or a cyclic formal such as 1,3-dioxolane. A particular useful combination of properties is obtained by the use of a blend of a major amount of trioxane, a small amount of a polyfunctional epoxy-containing compound having two copolymerizably reactive groups and a minor, but larger, amount of a second, highly reactive, comonomer of the type mentioned in the preceding sentence.

As mentioned above, other types of comonomers may also be used such as other cyclic ethers, e.g., formals such as dioxolane or pentaerythritol diformal, or oxetanes such as trimethylene oxide; lactones such as gamma-butyrolactone or propiolactone; cyclic anhydrides such as adipic anhydride; cyclic carbonates such as ethylene glycol carbonate or other comonomers known to the art, e.g., vinylidene compounds such as styrene or vinyl isobutyl ether. It is advantageous to limit the total amount of comonomers employed, including both epoxy- and non-epoxy-containing types, so that the oxymethylene content of the resulting copolymer is at least about 90 percent, preferably at least about 95 percent.

In general, the proportions of total comonomer employed may be, for example, the same as those used in the Walling et al., Heinz et al. and Fisher et al. patents previously mentioned. Preferably about 0.5 to 10 percent, based on the weight of the trioxane, of epoxy-containing comonomer is used, more preferably 0.5 to 5.0 percent. The copolymerizable composition may contain suitably 0.01 or more epoxy equivalent per mol of trioxane, more desirably about 0.02 to 0.1 (e.g. 0.04) epoxy equivalent per mol of trioxane.

Upon completion of the copolymerization reaction to the desired degree, the reaction mixture is usually deactivated by neutralizing the catalyst. A satisfactory method of deactivating the reaction mixture is by washing in an excess of a solution of tributylamine in acetone. The copolymer may then be recovered by successive washings and filtrations in acetone, followed by air drying.

If desired the copolymer may be given a thermal treatment or a hydrolysis or alcoholysis treatment such as is described in U.S. Patent No. 3,103,499 and South African Patent No. 61/1,726, the entire disclosures of which are incorporated herein by reference. The product of such treatment may be further stabilized by the addition of chemical stabilizers known to the art, such as are described in British Patent No. 951,272, Belgian Patent No. 603,786 and French Patents Nos. 1,330,587 and 1,338,054.

As shown in the following examples it is convenient to blend the formaldehyde with the trioxane before the addition of comonomer and catalyst. Other methods of addition may of course be employed. Thus the formaldehyde may be blended with the comonomer or with a blend of the comonomer and trioxane. Externally generated formaldehyde may even be fed to the copolymerizable reaction mixture after the addition of the catalyst, continuously or batchwise. It is preferred, however, to add the formaldehyde to the copolymerization zone or system prior to the addition of the catalyst, as the induction period starts upon introduction of the catalyst or initiator.

It is important to realize that the present invention contemplates the introduction of extraneous formaldehyde from any source into the mixture or blend of trioxane and epoxy-containing comonomer.

The invention is additionally illustrated by the following examples.

Example I 40 parts by weight of pure molten trioxane was placed in each of two equivalent glass reaction tubes and maintained at 65° C. out of contact with the atmosphere. To one tube (1B) was added 1.5 parts (1.25 moles/liter of reaction mixture) of anhydrous formaldehyde gas obtained by pyrolyzing alpha-polyoxymethylene and passing it through two traps maintained at —15° C. and a cyclohexane scrubber. The rubber caps of both tubes were then replaced by metal bottle caps lined with neoprene and Teflon gaskets. 0.9 part (2.2 weight percent)

(0.50 mole/liter of reaction mixture) of ethylene oxide liquid was injected into each tube and the tubes allowed to come to temperature equilibrium in a 65° C. oil bath. 0.0024 part of boron fluoride dibutyl etherate dissolved in 1.6 parts by weight of dry cyclohexane was injected into each tube (1A, not containing added formaldehyde; and 1B, containing 1.5 parts of added formaldehyde). This represents 20 p.p.m. of catalyst, calculated as $BF_3$. Both tubes were then rotated at 65° C. Tube 1A remained clear for 55 minutes and then became cloudy; it became milky 35 minutes later; another 50 minutes later it was removed and its contents deactivated with a solution of tributylamine in acetone. Tube 1B was similarly observed. It became cloudy as soon as the catalyst was added, was milky 35 minutes later; another 55 minutes later it was removed and its contents deactivated with the same deactivation solution. After three washes and filtrations from acetone, tube 1A yielded a copolymer having an I.V. (0.1 g./100 cc. 98/2 p-chlorophenol/alpha-pinene) of 1.9. Tube 1B yielded a copolymer of 2.0 I.V.

Example II

The procedure of Example I was repeated except that 0.0060 part of boron fluoride dibutyl etherate (50 p.p.m. $BF_3$) was added to each tube. The no-formaldehyde tube (2A) was initially clear but became milky at 15 minutes and turned solid 9 minutes later. The formaldehyde-containing tube (2B) turned milky at 10 seconds and was solid at 30 seconds. After being worked up, tube 2A yielded a copolymer with an I.V. of 0.8, and tube 2B yielded a copolymer with an I.V. of 0.8.

Example III (a) To 450 parts of purified molten trioxane in a $N_2$-purged flask was added 8.8 parts (0.65 mole/liter of reaction mixture) of formaldehyde generated as per Example I. The clear solution was transferred to a stainless steel sigma-blade mixing reactor and sealed off. 8.9 parts (0.45 mole/liter of reaction mixture) of liquid ethylene oxide was injected and the system stirred. Analysis of 25 ml. of the mixture showed 8.8 parts of free $CH_2O$/450 parts of batch to be present. Analysis of another 10 ml. sample of the mixture (still clear) by titration showed 8.9 parts of ethylene oxide/450 parts of batch to be present. 0.06 part of boron fluoride dibutyl etherate (50 p.p.m. $BF_3$) in 15.6 parts dry cyclohexane was injected at 63° C. and the temperature of the middle of the batch observed by a potentiometer thermocouple. An initial 10° C. exotherm peaked at 0.7 minute and dropped 3.0° C. at 1.7 minutes. The temperature drop indicated the end of the induction period. The temperature then rose to a 30° C. exotherm and then dropped 2.5 minutes later, indicating that the main copolymerization had occurred. The product was removed 10 minutes later to the deactivating solution.

(b) A control experiment using the same batch of trioxane was conducted by the same procedure except that the formaldehyde addition was omitted. Analysis for free formaldehyde just before addition of catalyst was 6 percent. The ethylene oxide analysis was 8.9 parts/450 part batch. Addition of catalyst was followed by an initial exotherm period of 13 minutes (compared to 1.7 minutes for the $CH_2O$-containing experiment). The major exotherm then began and the product was removed to the deactivating solution 10 minutes after the peak temperature had been reached.

The two products were worked up as in Example I. They were then hydrolyzed in a 10 percent solution of dimethyl formamide/benzyl alcohol 50 percent volume/50 percent volume containing tri-n-butylamine in the amount of 1 percent of the polymer weight. Product III(a) retained 82.3 percent of its weight for an overall yield of 75 percent. Control III(b) retained 85.3 percent of its weight for an overall yield of 60 percent. The hydrolyzed polymers, no-formaldehyde and formaldehyde-containing respectively, had the following characterizing properties: I.V. 0.9; 1.0; melt index 53, 29; $10x/x$ ratio [1] 23, 19; ethylene oxide total percent and ratio of mono:di:trimeric ethylene oxide units 2.60, 58:31:11; 2.54, 59:31:10.

Both hydrolyzed products were stabilized with 0.1 percent cyanoguanidine and 0.5 percent CAO-5 [3] in a Plastograph at 190° C. for 7 minutes. They then exhibited $K_{D230}$ values [2] of 0.013 and 0.012 (no-$CH_2O$, $CH_2O$).

Both products were compression molded into 125 mil 12 gram discs and 60 mil 3" x 3" plaques at 190° C. They exhibited the following physical test properties:

| | Without $CH^2O$ | With $CH^2O$ |
|---|---|---|
| Rockwell Hardness, (M-scale) | 77 | 78 |
| Vicat Softening Temperature, ° C | 160 | 162 |
| Instrumented Tensile Impact-Break Load, lbs | 88±6 | 91±7 |

Examples IV to VIII

In each of these examples 40 parts by weight of trioxane was copolymerized with ethylene oxide in the amount shown in Table I, below except for Example VIII, where trioxane was homopolymerized. The polymerization reaction was carried out at 65° C. in the presence of boron fluoride dibutyl etherate as the catalyst. The catalyst was dissolved in 1.6 parts by weight of cyclohexane and is reported in Table I in terms of parts per million of reaction mixture based on boron fluoride content.

Formaldehyde was added in Examples IV and VI in the amount shown in Table I by generation from alpha polyoxymethylene. The time it took for the reaction mixture to become cloudy, and the time it took for the reaction mixture to become a thick slush were observed and are shown in Table I.

TABLE I

| Example No. | Wt. of Ethylene Oxide | Wt. percent of Ethylene Oxide | Wt. of Formaldehyde | Moles of Formaldehyde, Moles of Ethylene Oxide | Catalyst (p.p.m.) | Time in Minutes | |
|---|---|---|---|---|---|---|---|
| | | | | | | Cloud | Slush |
| IV | 0.45 | 1.1 | 1.5 | 5.0 | 50 | 0 | 0.4 |
| V | 0.45 | 1.1 | 0 | 0 | 50 | 1.3 | 1.5 |
| VI | 0.45 | 1.1 | 0.8 | 2.3 | 20 | 0.1 | 52 |
| VII | 0.45 | 1.1 | 0 | 0 | 20 | 13 | 80 |
| VIII | 0 | 0 | 0 | 0 | 50 | 0 | 0.2 |

Example IX

This example illustrates the use of formaldehyde to decrease the induction period in the production of polymers of trioxane and a compound containing a plurality of epoxy groups, here specifically vinyl cyclohexene dioxide (1-epoxyethyl 3,4-epoxycyclohexane).

---

[1] The $10x/x$ ratio is the ratio between the weight of flow through a standard melt indexer at standard load and the weight of flow through the same melt indexer at ten times the standard load (both at standard conditions).

[2] $K_{D230}$ values are the average percent of polymer degraded per minute when the polymer is maintained at 230° C. in an open vessel in a circulating air oven for 45 minutes.

[3] 2,2'-methylene-bis(4-methyl, 6-tertiary butyl phenol).

To 1000 grams of molten trioxane there was added gaseous anhydrous formaldehyde until the formaldehyde content of the trioxane was 1.34 percent. A solution of 5 grams of vinylcyclohexene dioxide in 30 grams of cyclohexane was added, followed by 20 grams of ethylene oxide. Then 0.22 gram of boron fluoride di-n-butyl etherate dissolved in 20 grams of cyclohexane were added, all while the reaction mixture was maintained with stirring at 65° C. by maintaining the reaction flask in a constant temperature bath, also at 65° C. The temperature of the reaction mixture (still maintained in the constant temperature bath) rose to 75° C. 4 minutes after the catalyst was added. In another minute the reaction mixture became light yellow in color. 6.5 minutes after the caltalyst was added the reaction mixture had become very turbid due to formation of polymer. Analysis of the reaction mixture four minutes after the addition of the catalyst showed that only 18 percent of the original oxirane content was present.

In contrast, when similar conditions were used except that no formaldehyde was added, the induction period for the clear mixture to turn turbid was about 21 minutes and the oxirane content even after 14 minutes was about 60 percent of the original oxirane content.

As can be seen from Example VIII there was generally no induction period in the catalytic homopolymerization of molten trioxane. Other workers (e.g. Okamura, Tomura and Tomikawa in Kogyo Kagaku Zasshi, vol. 65, No. 5 (1962) pages 712–716) have reported a similar absence of a substantial induction period in the catalytic homopolymerization of trioxane in solution. Under some conditions, however, there may be an induction period during homopolymerization (as reported by Kern and Jaacks in J. Polymer Science 48 (1960) pages 399–404). It is within the scope of the present invention, although not preferred, to employ copolymerization conditions under which, were the comonomers to be absent, there would be an induction period for the homopolymerization of trioxane. As previously mentioned, when such a primary induction period does occur the amount of formaldehyde added to the system must be greater than that needed to eliminate the primary induction period, the additional formaldehyde being added in the amounts previously described.

The principle, preferred embodiment, and mode of operation of the present invention have been described in the foregoing specification. However, it should be understood that the invention which is intended to be protected herein, may be practiced otherwise than as described without departing from the scope of the appended claims.

We claim:

1. In the process for the copolymerization of trioxane, wherein trioxane is copolymerized with at least one epoxy-containing comonomer and wherein the copolymerization is effected in a copolymerization zone in the presence of a trioxane copolymerization catalyst, the improvement which comprises introducing extraneous formaldehyde into the copolymerization zone in an amount greater than that which is necessary to eliminate any primary induction period that occurs under the conditions of copolymerization employed.

2. The process of claim 1, wherein the extraneous formaldehyde is introduced into the zone so that it is present therein at the time of introduction of said catalyst.

3. The process of claim 2, wherein the amount of extraneous formaldehyde introduced into said zone in addition to the amount necessary to eliminate any primary induction period is at least 0.1 mol of formaldehyde per epoxy equivalent present therein.

4. The process of claim 2, wherein said trioxane is molten and the amount of extraneous formaldehyde introduced into said zone in addition to the amount necessary to eliminate any primary induction period is at least about 1.0 mol of formaldehyde per epoxy equivalent present therein.

5. A process for reducing the secondary induction period which occurs during the catalytic copolymerization of trioxane with an epoxy-containing comonomer, which process comprises contacting a mixture of the trioxane and the epoxy-containing comononer with extraneous formaldehyde in a copolymerization zone, said formaldehyde being introduced into said zone in an amount greater than the equilibrium concentration of formaldehyde that is necessary to eliminate any primary induction period which might occur.

6. The process of claim 5, wherein the amount of epoxy-containing comonomer present is the range of from about 0.5 to 10 percent, based on the weight of the trioxane, and the amount of extraneous formaldehyde introduced into the zone in addition to the amount necessary to eliminate any primary induction period is at least 1.0 mol of formaldehyde per epoxy equivalent.

7. The process of claim 5 wherein the trioxane is molten during copolymerization, the epoxy-containing comonomer is ethylene oxide and is present in an amount in the range of from about 0.5 to 5 percent, based on the weight of the trioxane, and the amount of extraneous formaldehyde introduced into the zone in addition to the amount necessary to eliminate any primary induction period is in the range of from 1.1 to 6 mols of formaldehyde per epoxy equivalent present therein.

8. The process of claim 7, wherein said formaldehyde is supplied as externally generated gaseous anhydrous formaldehyde.

References Cited

UNITED STATES PATENTS 3,337,507   8/1967   Gutweiler et al. _____ 260—67

WILLIAM H. SHORT, *Primary Examiner.*

L. M. PHYNES, *Assistant Examiner.*